United States Patent
Neathery et al.

(10) Patent No.: US 11,945,563 B2
(45) Date of Patent: Apr. 2, 2024

(54) PROPULSION CONTROL SELECTION AND SYNCHRONIZATION SYSTEM

(71) Applicant: Caterpillar Inc., Peoria, IL (US)

(72) Inventors: Brian P. Neathery, Hockley, TX (US); Cameron S. Gandy, Houston, TX (US)

(73) Assignee: Caterpillar Inc., Peoria, IL (US)

( * ) Notice: Subject to any disclaimer, the term of this patent is extended or adjusted under 35 U.S.C. 154(b) by 378 days.

(21) Appl. No.: 17/336,094

(22) Filed: Jun. 1, 2021

(65) Prior Publication Data
US 2022/0380014 A1 Dec. 1, 2022

(51) Int. Cl.
  G06F 3/0482 (2013.01)
  B63H 21/21 (2006.01)
  G06F 3/04847 (2022.01)
  B63H 21/14 (2006.01)

(52) U.S. Cl.
  CPC ......... *B63H 21/213* (2013.01); *G06F 3/0482* (2013.01); *G06F 3/04847* (2013.01); *B63H 21/14* (2013.01); *B63H 2021/216* (2013.01)

(58) Field of Classification Search
  CPC ................... B63H 21/213; G06F 3/048–05
  See application file for complete search history.

(56) References Cited

U.S. PATENT DOCUMENTS

| | | | |
|---|---|---|---|
| 4,012,015 A | 3/1977 | Nelson et al. | |
| 5,004,962 A * | 4/1991 | Fonss | F02B 73/00 318/85 |
| 5,336,120 A * | 8/1994 | Maurer | B63H 21/213 440/84 |
| 6,587,765 B1 * | 7/2003 | Graham | B63H 21/213 701/21 |
| 6,751,533 B2 | 6/2004 | Graham et al. | |

(Continued)

FOREIGN PATENT DOCUMENTS

EP 3048039 A1 7/2016

OTHER PUBLICATIONS

ZF Marine Electronics, L.L.C., "Mini Command Operation, Installation & Troubleshooting Manual", available on Nov. 27, 2007, available at <<https://www.straathofcontrols.com/media/pdfs/MM4000-I_Rev_E_5-08.pdf>>, pp. 29 and 72. (Year: 2007).*

(Continued)

*Primary Examiner* — Daniel Rodriguez

(57) ABSTRACT

A marine propulsion control system for use with a marine vessel, includes a port side engine in electronic communication with a port side engine controller and a starboard side engine in electronic communication with a starboard side engine controller. A control station includes a port lever configured to control a throttle of the port side engine, a starboard lever configured to control a throttle of the starboard side engine, and a user interface. A propulsion control processor is in electronic communication with the port side engine controller, the starboard side engine controller, and control station. In a synchronized operating mode, the propulsion control processor transmits a throttle instruction to the port side engine controller and the starboard side engine controller pursuant to a throttle position of a master lever corresponding to the first of the port lever and starboard lever to be actuated upon activation of the synchronized operating mode.

19 Claims, 6 Drawing Sheets

(56) References Cited

U.S. PATENT DOCUMENTS

| | | |
|---|---|---|
| 7,142,955 B1 | 11/2006 | Kern et al. |
| 7,510,449 B2 | 3/2009 | Ito et al. |
| 8,992,274 B1 * | 3/2015 | Ward .................... B63H 21/20 440/87 |
| 2005/0266743 A1 | 12/2005 | Okuyama |
| 2008/0318482 A1 | 12/2008 | Torrangs et al. |
| 2009/0287382 A1 * | 11/2009 | Blum ...................... F02D 11/02 701/51 |
| 2011/0137499 A1 * | 6/2011 | Sakaguchi ............. G05D 3/125 701/21 |

OTHER PUBLICATIONS

Written Opinion and International Search Report for Int'l. Patent Appln. No. PCT/US2022/030212, dated Oct. 4, 2022 (10 pgs).

* cited by examiner

PROPULSION CONTROL SELECTION AND SYNCHRONIZATION SYSTEM

TECHNICAL FIELD

The present disclosure relates to a marine propulsion control system and, more particularly, to a system and method for synchronized operation of a marine propulsion control system.

BACKGROUND

Marine vessels may be used in a variety of applications to provide transportation in waterways, such as oceans, lakes, rivers, and/or the like. Larger marine vessels often include a number of operator control stations outfitted with various devices for controlling steering and propulsion of the vessel. Larger marine vessels also typically include two engines positioned relative to the port and starboard sides of the vessel, and each of which may be independently controlled using corresponding port and starboard levers located at each operator control station.

In normal operation of the marine vessel, for example, an operator will want to have independent control of the two separate engines, because he or she may turn or otherwise maneuver the vessel by adding more power to the engine on one side of the vessel and reducing power to the engine on the other side of the vessel. However, in some situations, the operator may want to synchronize the engines to run both engines at the same speed. In this situation, either the port or the starboard lever will control both engines. Typically, selecting which of the port or starboard levers will control both engines is pre-established by the operator and/or a technician prior to installation of the levers on the marine vessel, such as during the initial configuration or commissioning of the vessel. This can prove problematic, as the operator and/or technician typically does not have control over the orientation of the levers at the operator control station, and the operator control stations are often located throughout a marine vessel, on both the port side and starboard side.

As a result, situations often arise where an operator approaches an operator control station, and is required to operate the vessel using the outboard lever. For example, if all operator control stations utilize the left (port engine) lever to control the synchronized engines, an operator approaching a control station mounted on the left side of the vessel would be required to reach across the right (starboard engine) lever in order to drive the vessel. This not only proves inconvenient to a marine vessel operator, but may result in inadvertent contact with other propulsion control devices at the operator control station.

Prior attempts at controlling synchronization of propulsion systems for marine vessels have been directed to systems that also require synchronized lever positioning. For example, U.S. Pat. No. 6,751,533 discloses a control system for a marine vessel with one or more control stations that is configured to provide for synchronized control of a plurality of engines in forward, neutral and reverse. However, to enter a synchronization mode, the operator must match the position of several control levers within 10% of each other. Only once the levers are aligned will the system enable the synchronization mode and enable control to a master control arm.

There is consequently a need for a system for synchronized operation of a marine propulsion control system.

SUMMARY

In accordance with one aspect of the present disclosure, a marine propulsion control system for use with a marine vessel is disclosed. The marine propulsion control system may include a port side engine in electronic communication with a port side engine controller and a starboard side engine in electronic communication with a starboard side engine controller. The marine propulsion control system may also include a control station with a port lever configured to control a throttle of the port side engine, a starboard lever configured to control a throttle of the starboard side engine, and a user interface. The marine propulsion control system may also include a propulsion control processor in electronic communication with the port side engine controller, the starboard side engine controller, and the control station. The marine vessel may have a synchronized operating mode in which the propulsion control processor transmits a throttle instruction to the port side engine controller and the starboard side engine controller pursuant to a throttle position of a master lever. The master lever may correspond to the first of the port lever and starboard lever to be actuated by an operator of the marine vessel upon an activation of the synchronized operating mode.

In accordance with another aspect of the present disclosure, a method of synchronizing engine propulsion of a marine vessel is disclosed. The marine vessel may include an operator station having a port side lever configured to control a throttle of a port side engine and a starboard side lever configured to control a throttle of a starboard side engine. The method may include selecting, by the operator, an automatic master lever selection operation; selecting, by an operator of the marine vessel, a synchronization operation mode; qualifying, by the propulsion control processor, the port side lever and the starboard side lever; actuating, by the operator, one of the port side lever and the starboard side lever; setting, by the propulsion control processor, a master lever corresponding to the actuated one of the port side lever and the starboard side lever; and operating the marine vessel in the synchronization operation mode pursuant to a throttle position of the master lever.

In accordance with yet another aspect of the present disclosure, a method of selecting a master lever of a marine vessel is disclosed. The marine vessel may include a propulsion control processor and an operator station having a port side lever and a starboard lever. The method may include activating, by the propulsion control processor, a synchronization operation mode of the marine vessel; actuating, by the operator, one of the port side lever and the starboard side lever; setting, by the propulsion control processor, a master lever corresponding to the actuated one of the port side lever and the starboard side lever; and operating the marine vessel in the synchronization operation mode pursuant to a throttle position of the master lever.

These and other aspects and features of the present disclosure will be better understood upon reading the following detailed description, when taken in conjunction with the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
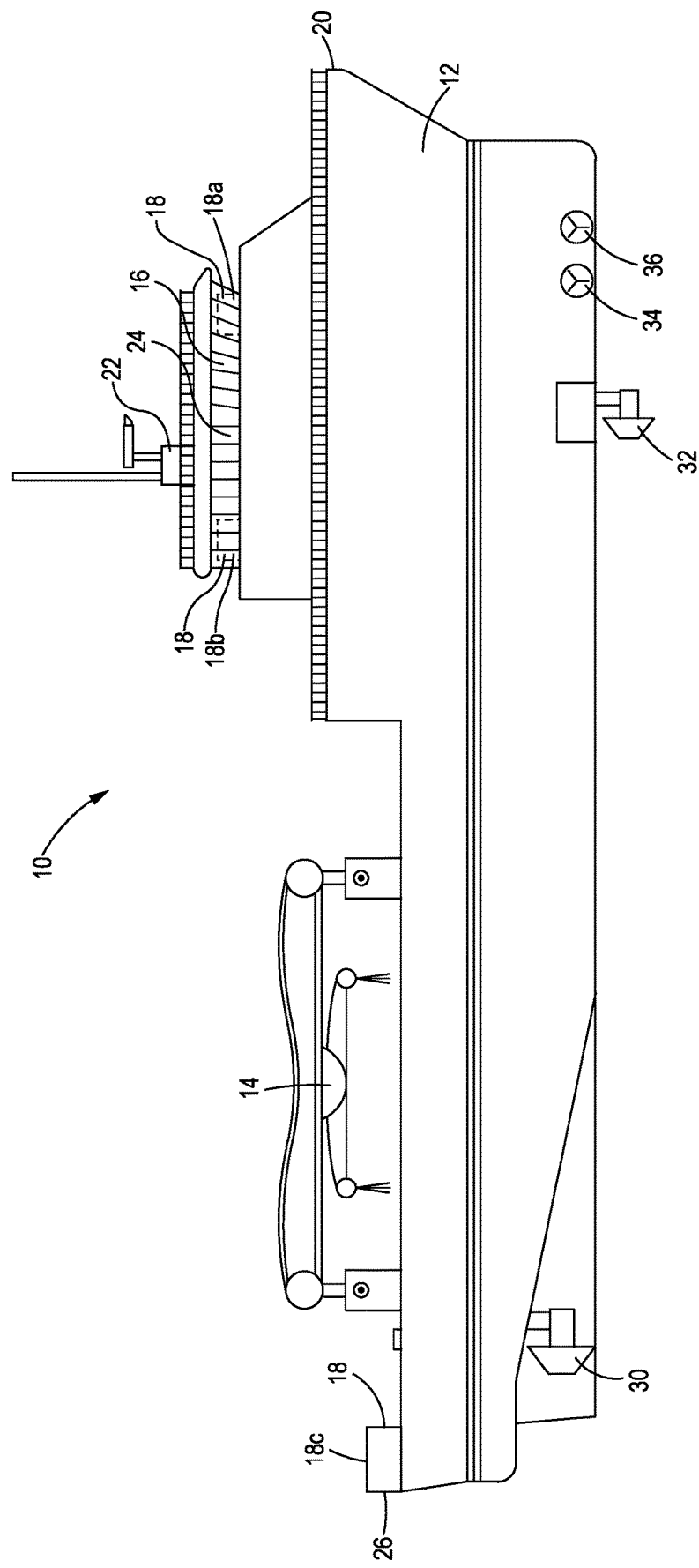
FIG. 1 is a side elevation view of a marine vessel in accordance with an embodiment of the present disclosure.

FIG. 1 illustrates a side elevation view of a marine vessel 10, according to an embodiment of the present invention. The exemplary marine vessel 10, as illustrated, may be an anchor handling tug supply vessel, although the term "marine vessel" may refer to any marine vessel that performs an operation associated with an industry such as, for example, recreation, fishing, transportation, shipping, and/or the like. As some examples, the marine vessel may be a power boat, a sail boat (with a marine propulsion system), a hovercraft, an air boat, an amphibious vehicle, a submarine, or another type of vehicle that is capable of traversing a waterway, such as an ocean, lake, river, and/or the like.

The marine vessel 10 may include a hull 12, a bridge 16, and one or more implements, such as a crane 14. The marine vessel 10 may also include at least one operator station 18, such as a main helm operator station 18a, for example, that may be centrally located on the bridge 16 and generally oriented so an operator may face a bow 20 of the marine vessel. Up to seven additional operator stations 18b-18h (see FIG. 2) may be located at redundant sites throughout the marine vessel 10, such as, for example, in a tower control station 22, on one or more fly bridges 24, at a rear of the bridge 16 but generally oriented toward a stern 26 of the marine vessel, or proximate the stern 26 of the marine vessel, among other locations. While exemplary positions of the main helm operator station 18a and additional operator stations 18b and 18c have been illustrated in FIG. 1, it should be understood that the operator stations 18 may be located anywhere on the marine vessel 10, and a total of eight operator stations (e.g. 18a-18h) may be supported by the present disclosure. Each operator station 18 may include a leverhead control station 40 (see FIGS. 2 and 3) along with other controls that may be used to control a plurality of propulsion mechanisms 28, 30, 32, 34, 36 for propelling the marine vessel 10 during transit, such as while travelling between locations, and during dynamic positioning and/or other short maneuvers.

As illustrated, the marine vessel 10 may include, for example, a port stern thruster 28 (FIG. 2), a starboard stern thruster 30, a bow thruster 32, and ancillary bow thrusters 34, 36. The port stern thruster 28 and starboard stern thruster 30 may provide the main propulsive power when the marine vessel 10 is in transit, and may be located at, adjacent to or towards the stern 26 of the marine vessel. The port stern thruster 28 may be positioned proximate a port side of the marine vessel 10, while the starboard stern thruster 30 may be positioned proximate the starboard side of the marine vessel. The bow thruster 32 and ancillary bow thrusters 34 may be utilized for performing short maneuvers, such as docking, and may be aligned with each other and along a center of the marine vessel 10.

Figure 2:
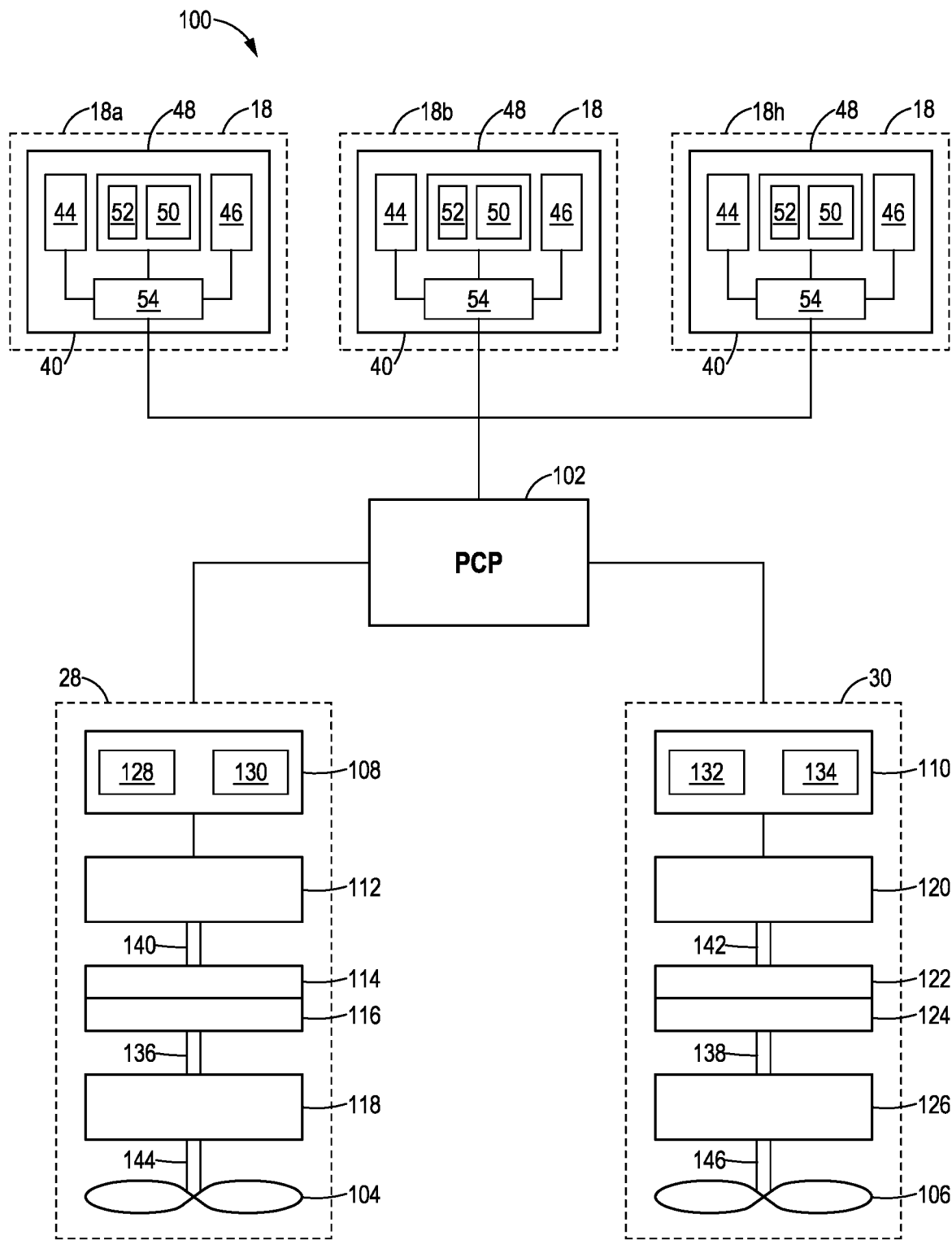
FIG. 2 is a schematic representation of an exemplary embodiment of a marine propulsion control system according to the present disclosure.
Figure 3:
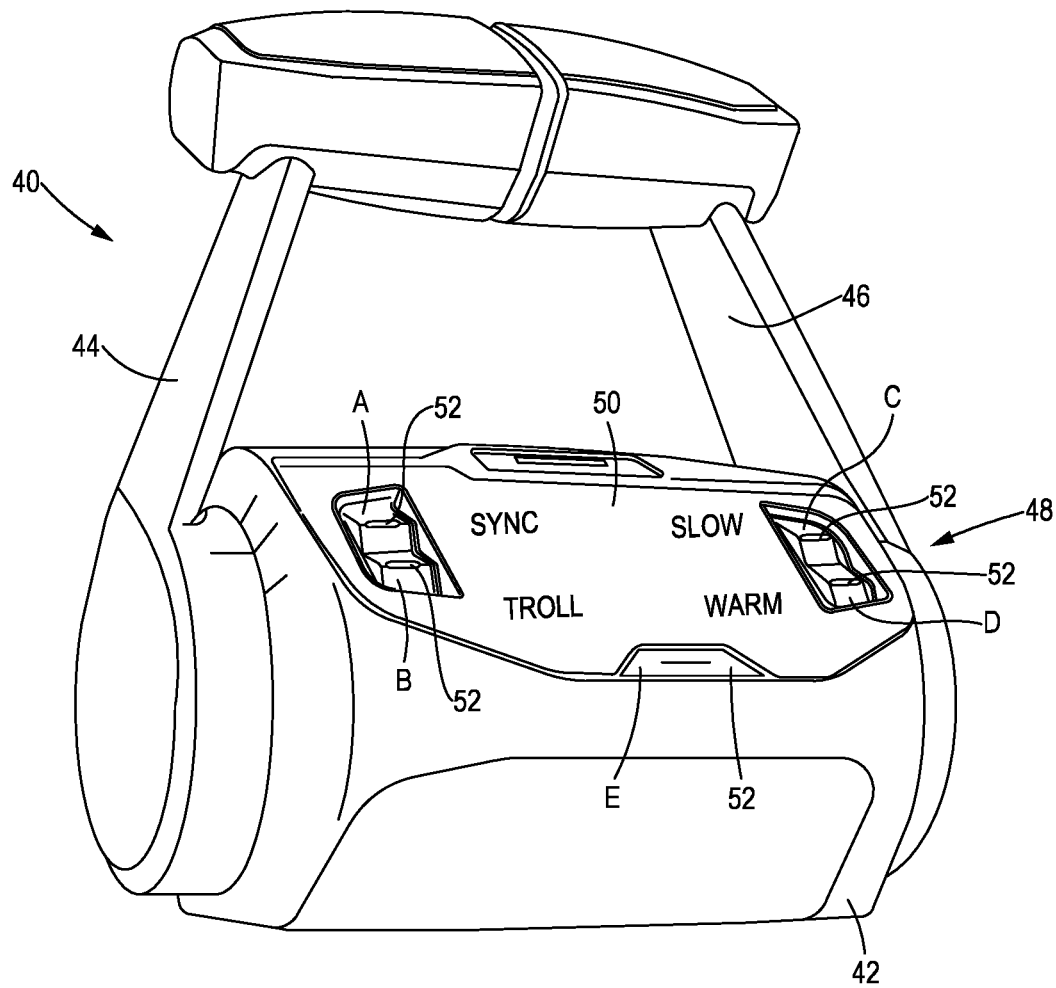
FIG. 3 is a perspective view of a control station according to an embodiment of the present disclosure.

Referring now to FIGS. 2 and 3, the marine vessel 10 may further include a marine propulsion control (MPC) system 100. The MPC system 100 may include a propulsion control processor (PCP) 102, which may be the primary processor for the MPC system, and may be in electronic communication with each leverhead control station 40 at each operator station 18 via a single data link. As noted above, the MPC system 100 may support at least one operator station 18, each up to eight operator stations 18a-18h, each with its own leverhead control station 40. In the illustrated embodiment, the MPC system 100 is parallel propulsion system including the port stern thruster 28, and the starboard stern thruster 30 arranged in parallel with the port stern thruster. The starboard stern thruster 30 may be identical to the port stern thruster 28 or may include one or more similar or the same components. In alternative embodiments, the MPC system 100 may not be a parallel propulsion system, and may include more or less than two stern thrusters.

More specifically, the PCP 102 may be in electronic communication with a port engine electronic control module (ECM) 108 and a starboard engine ECM 110. The port engine ECM 108 may be electronically coupled to a port side engine 112. The port stern thruster 28 may further include a port side motor-generator 116, a port side clutch 114, a port side gearbox 118, and a port side propulsion device 104, arranged in series. The starboard engine ECM 110 may be electronically coupled to a starboard side engine 120. More specifically, the starboard stern thruster 30 may also include a starboard side motor-generator 124, a starboard side clutch 122, a starboard side gearbox 126, and a starboard side propulsion device 106, arranged in series. As illustrated, the starboard stern thruster 30 may include the same components as the port stern thruster 28. In other embodiments, however, the port stern thruster 28 and the starboard stern thruster 30 may include one or more differing components.

The port side engine ECM 108 and the starboard side engine ECM 110 may include any type of device or any type of component that may interpret and/or execute information and/or instructions stored within a memory 128, 132 to perform one or more functions. The memory 128, 132 may include a random access memory ("RAM"), a read only memory ("ROM"), and/or another type of dynamic or static storage device (e.g., a flash, magnetic, or optical memory) that stores information and/or instructions for use by the example components, including the information and/or instructions used by the port side engine ECM 108 and the starboard side engine ECM 110, respectively. Additionally, or alternatively, the memory may include non-transitory computer-readable medium or memory, such as a disc drive, flash drive, optical memory, read-only memory (ROM), or the like. The memory 128, 132 may store the information and/or the instructions in one or more data structures, such as one or more databases, tables, lists, trees, etc. The port side engine ECM 108 and starboard side engine ECM 110 may also include a processor 130, 134 (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.), and/or any other hardware and/or software. The port side engine ECM 108 may transmit data via a network (not shown) to at least the PCP 102 and the port side engine 112. Likewise, the starboard side engine ECM 110 may transmit data via a network (not shown) to at least the PCP 102 and the starboard side engine 112.

The port side engine 112 and the starboard side engine 120 may be configured in a variety of ways. Any suitable power source capable of driving the propulsion devices 104, 106 may be used. Suitable power sources may include, but not be limited to, reciprocating engines, such as diesel, gaseous (e.g. liquified natural gas), gasoline, or dual fuel engines, and turbines, such as steam, gas or nuclear-powered steam turbines. The size and configuration of the power source may also vary in different embodiments. In the illustrated embodiment, the port and starboard side engines 112, 120 are internal combustion diesel engines.

The port side engine 112 may drive a port side output shaft 136 via a port side input shaft 140 and a clutched connection to the port side motor-generator 116 and the port side output shaft. The port side clutch 114 may provide the clutched connection such that the port side motor-generator 116 may be fixed for rotation with the port side output shaft 136, not with the port side input shaft 140. The port side propulsion device 104 may be a propeller connected to the other components of the port stern thruster 28 by a port side propeller shaft 144. The port side propeller shaft 144 may be connected to port side output shaft 136 via the port side gearbox 118. Likewise, the starboard side engine 120 may drive a starboard side output shaft 138 via a starboard side input shaft 142 and a clutched connection to the starboard side motor-generator 124 and the starboard side output shaft. The starboard side clutch 122 may provide the clutched connection such that the starboard side motor-generator 124 may be fixed for rotation with the starboard side output shaft 138, not with the starboard side input shaft 142. The starboard side propulsion device 106 may be a propeller connected to the other components of the starboard stern thruster 30 by a starboard side propeller shaft 146. The starboard side propeller shaft 146 may be connected to starboard side output shaft 138 via the starboard side gearbox 126.

In the exemplary embodiment, the port and starboard stern thrusters 28, 30 are each illustrated with a single gearbox 118, 126; however, in alternative embodiments, multiple gearboxes on each of the port and starboard stern thrusters may be included. Furthermore, while not illustrated, each gearbox 118, 126 may be electronically coupled to the PCP 102.

Referring now to FIGS. 3-6, with continued reference to FIG. 2, the marine propulsion system 100 also includes at least one operator station 18, and up to eight operator stations 18a-18h. Each operator station 18 includes a leverhead control station 40. The leverhead control station 40 may include a housing 42, a port lever 44, a starboard lever 46, and a user interface 48 including a display screen 50 and at least one display input 52. In this arrangement, the leverhead control station 40 provides throttle and transmission control via the port lever 44 for the port side engine 112 and via the starboard lever 46 for the starboard side engine 120. The leverhead control station 40 may be electronically connected to the PCP 102 via a processor 54 that may be also be electronically coupled to the port lever 44, the starboard lever 46 and the user interface 48. When the marine vessel 10 includes more than one operator station 18, each operator station may be redundant, with each operator station having full system control despite having different physical locations throughout the marine vessel. As such, each operator station 18 may have independent control over both the port stern thruster 28 and the starboard stern thruster 30.

The user interface 48 of the leverhead control station 40 may be configured in a variety of ways for displaying information related to the operation of the marine propulsion system 100. For example, the at least one display input 52 of the illustrated leverhead control station 40 may include a plurality of buttons A, B, C, D, E; however, the at least one display input may include any type of input device(s). As illustrated, an operator at an active operator station 18 may utilize the buttons A, B, C, D, E in a variety of ways, such as to depress the button to make a selection or to respond to information provided on the display screen 50, or to depress and hold the button for a predetermined period of time to, for example, adjust or set specific operation settings. These features will be described in further detail below. In an alternative embodiment, for example, the at least one display input 52 and the display screen 50 may be combined into a single device, such as, for example, a touchscreen or the like. In the illustrated embodiment, the display screen 50 may be configured to provide a variety of information related to the operation of the marine propulsion system 100, such as, for example, a power, torque, and/or speed of the port side and starboard side engines 112, 120, a power, torque, and/or speed of the port side and starboard side motor-generators 116, 124, a current operating mode of the marine propulsion system, alternative operating modes of the marine propulsion system, as well as various operational parameters, limits, alarms, and warnings, and any other useful information to be displayed to an operator of the marine vessel 10.

The display screen 50 illustrated in FIG. 3 shows a home screen providing a number of operating modes including SYNC, TROLL, SLOW and WARM. In one embodiment, pressing button E may display this home screen to an operator of the marine vessel 10. Pressing button D may activate a WARM operating mode, which may be enabled by an operator when both the port and starboard engines 112, 120 are in neutral. In the WARM operating mode, for example, the engine speed of the port and starboard engines 112, 120 may be increased, while maintaining a neutral gear position. The WARM operating mode may be deactivated by pressing button D a second time. An operator may press button C to activate a SLOW operating mode and/or to open a new screen with settings related to the SLOW operating mode. In an exemplary embodiment, activating the SLOW operating mode reduces a maximum engine speed that may be reached when the port lever 44 and/or starboard lever 46 is moved to a maximum forward position. For example, when the port lever 44 and/or starboard lever 46 is in a maximum forward position, the port and/or starboard engines 112, 120 may only reach 50% of their maximum speed. This may be particularly useful during docketing maneuvers, for example. The SLOW operating mode may be deactivated by pressing button C a second time. In one embodiment, the marine vessel 10 may be equipped with trolling valves (not shown), and an operator of the marine vessel may press button B to enabled a TROLL mode, which may enable the operator to set the trolling valve position (e.g. full slip to no slip) as well as a gear position (e.g. forward, reverse, neutral). The TROLL operating mode may be deactivated by pressing button B a second time.

Figure 4:
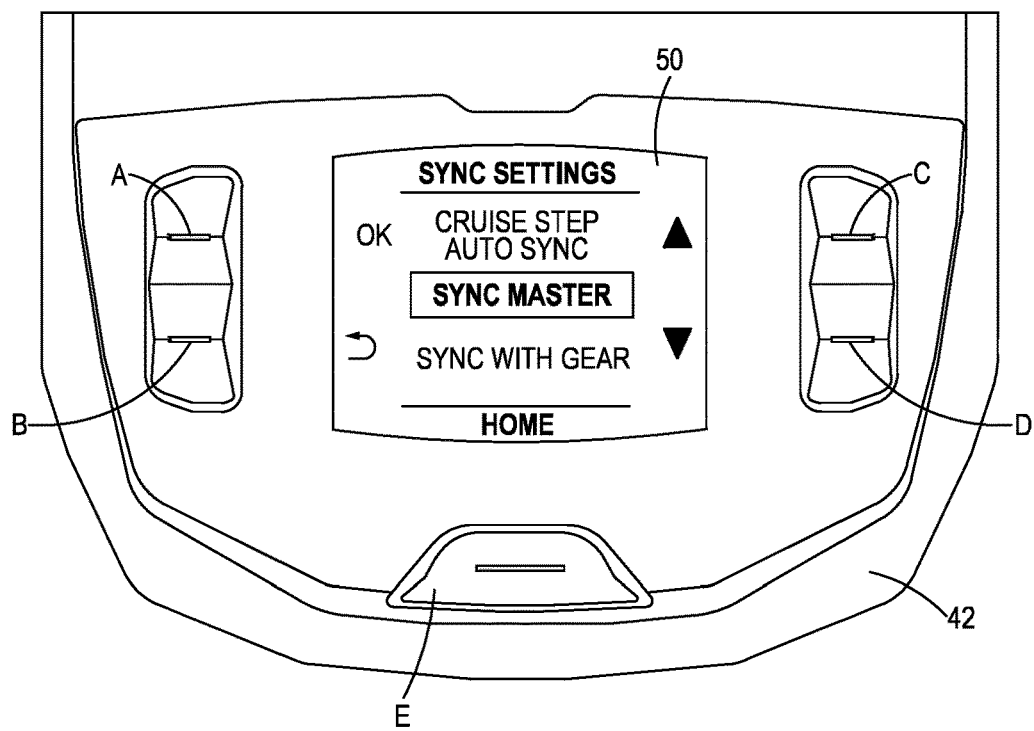
FIG. 4 is a front elevated view of a portion of a control station, in accordance with an embodiment of the present disclosure.

Button A, as displayed on the home screen in FIG. 3 is associated with a SYNC operating mode (hereinafter, "SYNC Mode"). In SYNC Mode, the speed of the port and starboard engines 112, 120 may be synchronized to a single lever position at an active operator station 18. When an operator presses button A, a SYNC Settings screen may be displayed as illustrated in FIG. 4, and may include a plurality of menu options, including CRUISE STEP, AUTO SYNC, SYNC MASTER, and SYNC WITH GEAR, among others. Here, pressing button C may rotate the options downward and pressing button D may rotate the options upward. Pressing button E may navigate the operator of the marine vessel 10 to the home screen, as illustrated in FIG. 3. Pressing button B may navigate the operator to the immediately previous screen, which may correspond to the home screen, an operating mode settings screen (not shown), or other screen. Finally pressing button A may navigate the operator to a new screen associated with the highlighted menu option.

As illustrated in FIG. 4, the SYNC Settings screen may include a CRUISE STEP operating mode. When SYNC-CRUISE STEP is activated by pressing button A while CRUISE STEP is highlighted, the speed of the port and starboard engines 112, 120 may be synchronized and an operator may increment and decrement the synchronized engine speed using buttons C and D at an active operator station 18. Additionally, if an operator of the marine vessel 10 selects the AUTO SYNC operating mode, then the port and starboard engines 112, 120 may synchronize automatically when the difference between the positions of the port and starboard levers 44, 46 corresponds to less than 50 RPM indicate requested engine speeds which are less than 50 rpm apart for more than 10 seconds. Once the AUTO SYNC mode is activated, a master lever may control both the port and starboard side engines 112, 120. The master lever may be set according to the procedure described below. As shown, the SYNC Settings screen may further include at least a SYNC MASTER operating mode and a SYNC WITH GEAR operating mode. Each of these operating modes may request an operator of the marine vessel 10 to first select a master lever, which will be described below.

Figure 5:
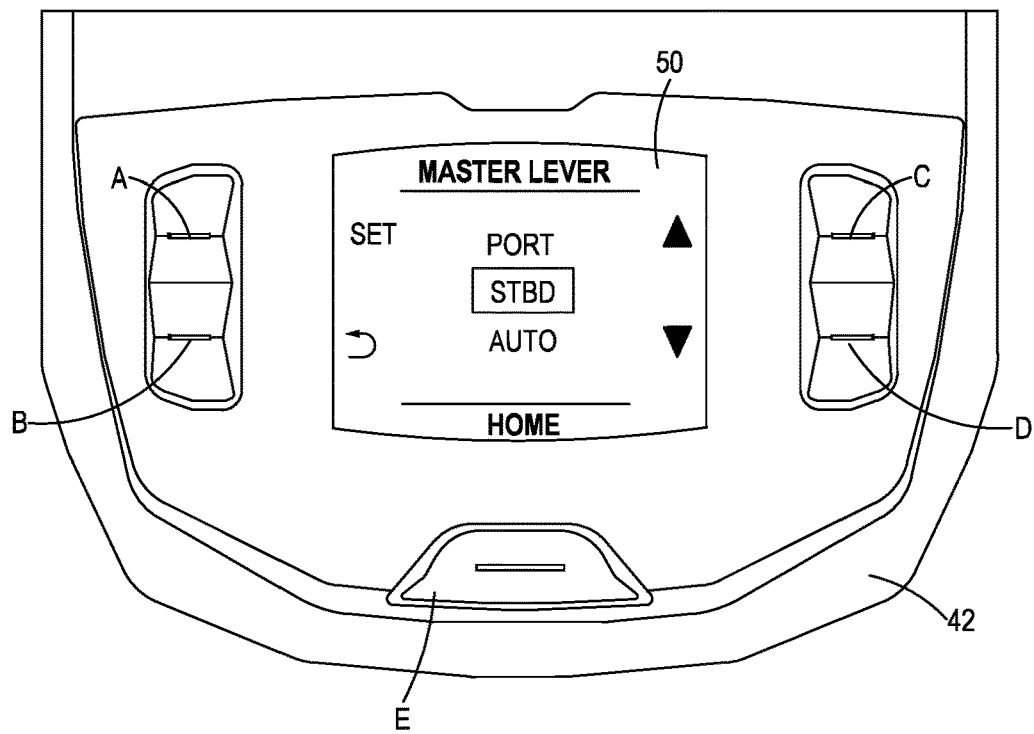
FIG. 5 is a front elevated view of a portion of a control station, in accordance with an embodiment of the present disclosure.

With specific reference to FIGS. 4 and 5, pressing button A while SYNC MASTER is highlighted in the SYNC Settings screen (FIG. 4) may navigate an operator of the marine vessel to the Master Lever screen illustrated in FIG. 5. SYNC MASTER may comprise an operator setting that may be used to select a master lever for operation of the marine vessel 10 in SYNC Mode operations. As shown in FIG. 5, the operator of the marine vessel 10 may select from PORT (corresponding to the port lever 44), STBD (corresponding to the starboard lever 46), or AUTO as the master lever by using buttons C and D to rotate through the options of PORT, STBD or AUTO and pressing button A to set the selection. Pressing button B may navigate the operator to the immediately previous screen, which may correspond to the SYNC Master screen (FIG. 4), without changing the master lever setting. More specifically, if an operator of the marine vessel 10 selects PORT, then the port lever 44 is set as the master lever, and forward and rearward movement of the port lever may adjust the speed of the synchronized port side and starboard side engines 112, 120. Similarly, if an operator of the marine vessel 10 selects STBD, then the starboard lever 46 is set as the master lever, and forward and rearward movement of the starboard lever may adjust the speed of the synchronized port side and starboard side engines 112, 120. Finally, if AUTO is selected, then the master lever is assigned to the first lever that is moved.

With reference back to FIG. 4, if an operator of the marine vessel 10 selects the SYNC WITH GEAR operating mode, then the master lever (which may be selected as described above) may not only control the synchronized engine speed of the port and starboard side engines 112, 120, but may also control a synchronized port and starboard side gearbox 118, 126. In this embodiment, the port and starboard side gearboxes 118, 126 may be electronically coupled to the PCP 102.

Figure 6:
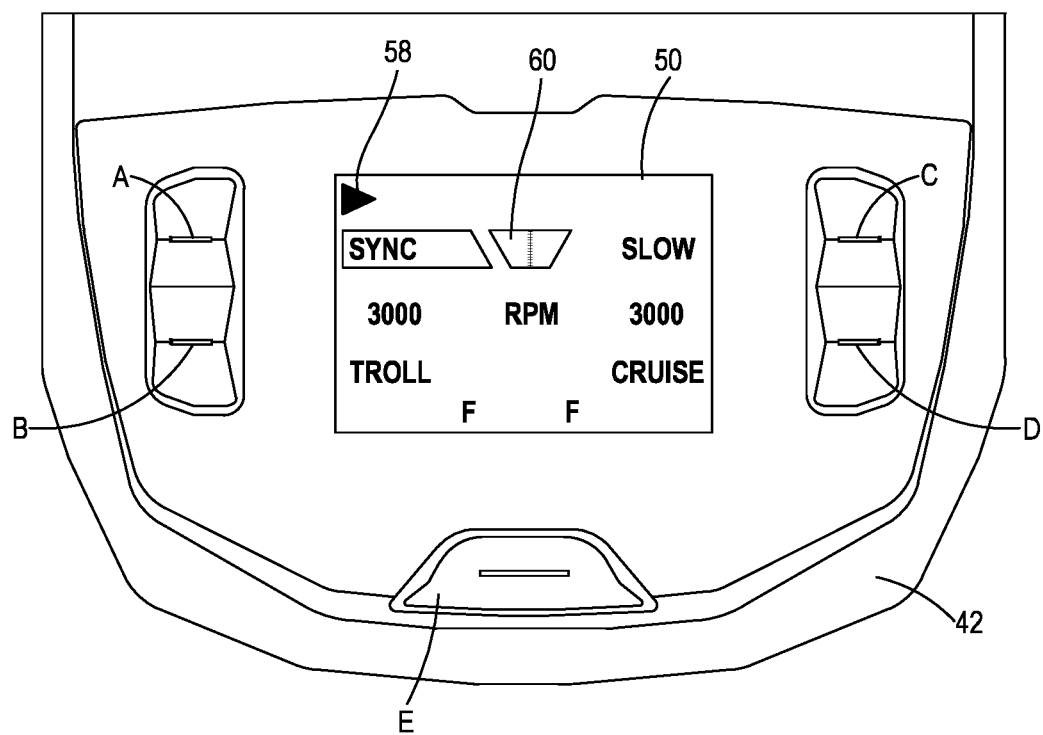
FIG. 6 is a front elevated view of a portion of a control station, in accordance with an embodiment of the present disclosure.

Referring now to FIG. 6, an active home screen indicating an active SYNC Mode is illustrated. More specifically, a SYNC indicator (e.g. the word SYNC) may be highlighted to indicate that SYNC Mode is currently active. The currently assigned master lever may also be illustrated on the display screen 50 of an active operator station 18 during operation of the marine vessel 10. The display screen 50 may include an indicator 58, positioned along a top portion of the screen, that indicates which of the port lever 44 or the starboard lever 46 is currently designated the master lever. In the illustrated example in FIG. 6, the indicator 58 is provided as an arrow that may point to the side of the marine vessel corresponding to the master lever. In FIG. 6, the indicator 58 is pointing to the right (starboard) side of the marine vessel 10, thereby indicating the starboard lever 46 is the master lever. If, for example, the port lever 44 were the designated master lever, then the indicator 58 may point to a left (port) side of the marine vessel 10. The active home screen may also provide information related to the speed of the synchronized port and starboard side engines 112, 120, including, for example, the current speed (illustrated as 3000 RPM) as well as a graphical indicator 60 representing the position of the port and starboard levers 44, 46.

Referring back to FIG. 2, and with continued reference to FIG. 6, in operation of the marine vessel 10, while SYNC Mode is active, the PCP 102 may transmit a command to the processor 54 of the leverhead control station 40 to highlight the SYNC indicator (e.g. the word SYNC) on the display screen 50. In the illustration provided in FIG. 6, SYNC Mode may be deactivated by pressing button A. Once SYNC Mode is deactivated, the PCP 102 may transmit a command to the processor 54 of the leverhead control station 40 to unhighlight the SYNC indicator on the display screen 50.

INDUSTRIAL APPLICABILITY

The disclosed marine propulsion system may be applied in a wide variety of marine applications. While the exemplary embodiments of the marine propulsion system are illustrated as a dual engine, parallel propulsion system, it will be understood that inventive aspects of the disclosed marine propulsion system may be used in propulsion systems having more than or less than two engines and other than parallel arrangements.

Figure 7:
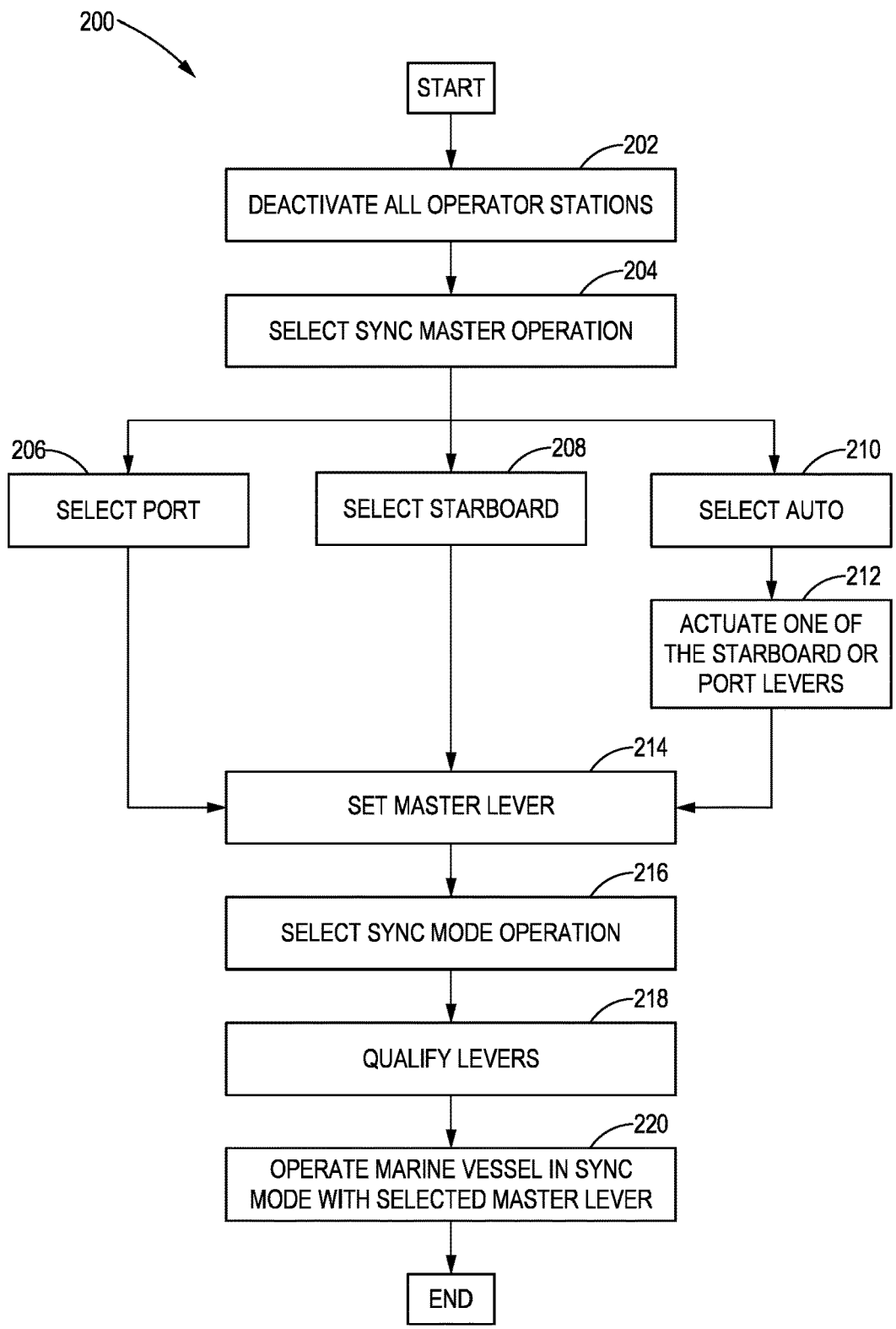
FIG. 7 is a flowchart illustrating a method of synchronizing engine propulsion of a marine vessel, in accordance with an embodiment of the present disclosure.

A series of steps 200 for selecting a master lever and operating the marine vessel 10 in SYNC Mode is illustrated in a flowchart format in FIG. 7. Continued reference will also be made to elements illustrated in FIGS. 1-6. In a first step 202, all operator stations 18 may be deactivated. All operator stations 18 may be inactive upon startup of the marine vessel 10, or may be manually deactivated. As such, while deactivation of all operator stations 18 may be achieved by completely powering down the marine vessel 10 and then restarting; more often, however, deactivating an active operator station 18 may be achieved individually, for example by pushing and holding a control station activation button associated with the active operator station for a predetermined period of time. As such, if any operator station 18 is active, the PCP 102 may transmit a command the processor 54 of the leverhead control station 40 to disable display and select of a master lever through the user interface 48.

Once all operator station 18 are deactivated, the PCP 102 may instruct the leverhead control station 40 to enable navigation by the operator of the marine vessel 10 to the SYNC Settings screen as illustrated in FIG. 4. The operator may then select the SYNC Master setting option (step 204) by using the buttons C and D to highlight the SYNC Master setting option and pressing button A. The SYNC Master operation may be used to choose the master lever for SYNC Mode operations. Upon selection of the SYNC Master setting option, the PCP 102 may transmit a command to the leverhead control station 40 to display the Master Lever screen, as illustrated in FIG. 5. Here, the operator may be prompted to select one of PORT, STBD and AUTO (steps 206 through 210).

As described above, the operator may use buttons C and D to navigate to, and highlight, the PORT option, and press button A to select the port lever 44 as the master lever during SYNC Mode operations (step 206). The operator's PORT selection may be transmitted to the PCP 102, which may set the port lever 44 as the master lever during SYNC Mode operations (step 214). Alternatively, the operator may use buttons C and D to navigate to, and highlight, the STBD option, and press button A to select the starboard lever 46 as the master lever during SYNC Mode operations (step 208). The operator's STBD selection may be transmitted to the PCP 102, which may set the starboard lever 46 as the master lever during SYNC Mode operations (step 214). Finally, the operator may use buttons C and D to navigate to, and highlight, the AUTO option, and press button A (step 210). The operator's AUTO selection may be transmitted to the PCP 102, which may then wait until one of the starboard lever 46 or the port lever 44 is actuated by the operator of the marine vessel (step 212). The first of the port lever 44 or starboard lever 46 to be actuated after SYNC Mode is activated (see step 220) will be set by the PCP 102 as the master lever during SYNC Mode operations (step 214). Once the master lever is set (step 214), the PCP 102 may broadcast the SYNC Master setting to the port side and starboard side engine ECMs 108, 110 via an engine datalink CAN message. Further, the master lever (whether the port lever 44 or the starboard lever 46) set via the SYNC Master setting should be applied to all operator stations 18, and should be retained through any power cycles performed by the marine vessel.

The operator of the marine vessel may request SYNC Mode operation prior to, or after, a master lever has been set. While setting a master lever is illustrated in FIG. 7 preceding the selection of SYNC Mode operation, it should be known that selecting the master lever may proceed the selection of SYNC Mode by the operator of the marine vessel. Regardless, the operator may request SYNC Mode operation of the marine vessel 10 by pressing button A from the home screen, as illustrated in FIG. 3 (step 216).

Once SYNC Mode has been requested by the operator, the PCP 102 may command the active operator station 18 to display an operator aid indicator (not shown) such as an icon or light, via the user interface 48 until the port lever 44 and starboard lever 46 are qualified (step 218). Lever qualification for SYNC Mode activation requires that the port lever 44 and starboard lever 46 indicate requested engine speeds which are less than 50 RPM apart. If the port and starboard levers 44, 46 are not qualified within a pre-determined period of time, such as 10 seconds, then the SYNC Mode activation request may be aborted, and the operator aid indicator may be removed from the user interface 48.

Finally, once the port lever 44 and starboard lever 46 are qualified, the PCP 102 may activate SYNC Mode and command the same engine speed for both the port and starboard engines 112, 120 pursuant to the throttle position set by the master lever. In this manner, while SYNC Mode is activated, the master lever may be configured only to control engine speed requests and gear requests as detailed above with respect to the SYNC WITH GEAR operation mode (FIG. 4). Furthermore, when SYNC Mode is active, the PCP may transmit a commend to all operator stations 18 to display via display screen 50, the master lever indicator 58 and the SYNC indicator that may be associated with one of the buttons A, B, C or D (FIG. 6).

An operator may further manually abort a SYNC Mode activation by pressing the button A, B, C or D associated with the SYNC indicator. Once a SYNC deactivation is initiated, the PCP 102 may command the active operator station 18 to display an operator aid indicator (not shown) such as an icon or light, via the user interface 48, until the port and starboard levers 44, 46 are qualified as described above, or until a predetermined period of time, such as 10 seconds, has elapsed. The operator may be able to cancel the deactivation request, while the operator aid indicator is still present, by pressing button A, B, C or D associated with the SYNC indicator a second time. If the levers are not qualified at the end of 10 seconds (and the deactivation is not cancelled), the engine ECM coupled to the non-master lever shall be instructed to decrease the engine speed down to the minimum engine speed an associated transmission placed in a netural position.

While a series of steps and operations have been described herein, those skilled in the art will recognize that these steps and operations may be re-arranged, replaced, eliminated, or performed simultaneously without departing from the spirit and scope of the present disclosure as set forth in the claims.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A marine propulsion control system for use with a marine vessel, the marine propulsion control system comprising:
   a port side engine in electronic communication with a port side engine controller;
   a starboard side engine in electronic communication with a starboard side engine controller;
   a control station including a port lever configured to control a throttle of the port side engine, a starboard lever configured to control a throttle of the starboard side engine, and a user interface; and
   a propulsion control processor in electronic communication with the port side engine controller, the starboard side engine controller, and the control station,
   the marine vessel having a synchronized operating mode in which the propulsion control processor transmits a throttle instruction to the port side engine controller and the starboard side engine controller pursuant to a throttle position of a master lever, the master lever corresponding to the first of the port lever and starboard lever to be actuated by an operator of the marine vessel upon an activation of the synchronized operating mode, wherein the user interface includes a display in electronic communication with the propulsion control processor, the display configured to display a master lever selection screen including a plurality of master lever options, the master lever options including at least one of port, starboard and auto.

2. The marine propulsion control system of claim 1, wherein the marine vessel further includes a plurality of operator stations, each operator station including at least one control station.

3. The marine propulsion control system of claim 1, wherein the port side engine is coupled to a port side propulsion device and the starboard side engine is coupled to a starboard side propulsion device.

4. The marine propulsion control system of claim 1, wherein the user interface further includes a display input.

5. The marine propulsion control system of claim 4, wherein the display input includes a plurality of buttons, and wherein each of the plurality of buttons is in electronic communication with the propulsion control processor.

6. The marine propulsion control system of claim 5, wherein the synchronized operating mode is activated by the operator of the marine vessel, the operator activating the synchronized operating mode by actuating one of the plurality of buttons.

7. The marine propulsion control system of claim 5, wherein the operator of the marine vessel may select one of the master lever options using one of the plurality of buttons.

8. A method of synchronizing engine propulsion of a marine vessel, the marine vessel including an operator station having a port side lever configured to control a throttle of a port side engine and a starboard side lever configured to control a throttle of a starboard side engine, the method comprising:
 selecting, by an operator of the marine vessel, an automatic master lever selection operation;
 selecting, by the operator, a synchronization operation mode;
 qualifying, by a propulsion control processor, the port side lever and the starboard side lever;
 actuating, by the operator, one of the port side lever and the starboard side lever;
 setting, by the propulsion control processor, a master lever corresponding to the actuated one of the port side lever and the starboard side lever; and
 operating the marine vessel in the synchronization operation mode pursuant to a throttle position of the master lever.

9. The method of claim 8, wherein the port side engine is electronically coupled to a port side engine ECM and the starboard side engine is electronically coupled to a starboard side engine ECM.

10. The method of claim 9, wherein the operating the marine vessel in the synchronization operation mode includes transmitting, by the propulsion control processor, a speed command to the port side engine ECM and the starboard side engine ECM, the speed command corresponding to a throttle position of the master lever.

11. The method of claim 8, wherein a throttle position of the port side lever corresponds to a requested port engine speed and a throttle position of the starboard side lever corresponds to a requested starboard engine speed.

12. The method of claim 11, wherein qualifying the port side lever and the starboard side lever includes determining whether a difference in the requested port engine speed and the requested starboard side engine speed is less than a predetermined qualifying speed threshold.

13. The method of claim 12, wherein the predetermined qualifying speed threshold corresponds to 50 RPM.

14. The method of claim 12, wherein when the difference in the requested port engine speed and the requested starboard side engine speed is greater than or equal to the predetermined qualifying speed threshold for a predetermined period of time, the method of synchronizing engine propulsion of a marine vessel is aborted.

15. The method of claim 14, wherein the predetermined period of time corresponds to 10 seconds.

16. The method of claim 8, further including displaying, on a display positioned at the operator station, a first indicator corresponding to which one of the port side lever and the starboard lever corresponds to the master lever.

17. The method of claim 16, further including deactivating the operator station.

18. A method of selecting a master lever of a marine vessel, the marine vessel including a propulsion control processor and an operator station having a port side lever and a starboard lever, the method comprising:
 activating, by the propulsion control processor, a synchronization operation mode of the marine vessel;
 activating, by the propulsion control processor, an automatic master lever selection operation;
 qualifying, by the propulsion control processor, the port side lever and the starboard side lever;
 actuating, by an operator of the marine vessel, one of the port side lever and the starboard side lever;
 setting, by the propulsion control processor, a master lever corresponding to the actuated one of the port side lever and the starboard side lever; and
 operating the marine vessel in the synchronization operation mode pursuant to a throttle position of the master lever.

19. The method of claim 18, wherein the operating the marine vessel in the synchronization operation mode includes operating each of a plurality of engines associated with the marine vessel at a same speed pursuant to the throttle position of the master lever.

* * * * *